March 14, 1967  A. SPAGNOLO  3,308,747
GRILLERS AND LIKE APPLIANCES
Filed July 21, 1964
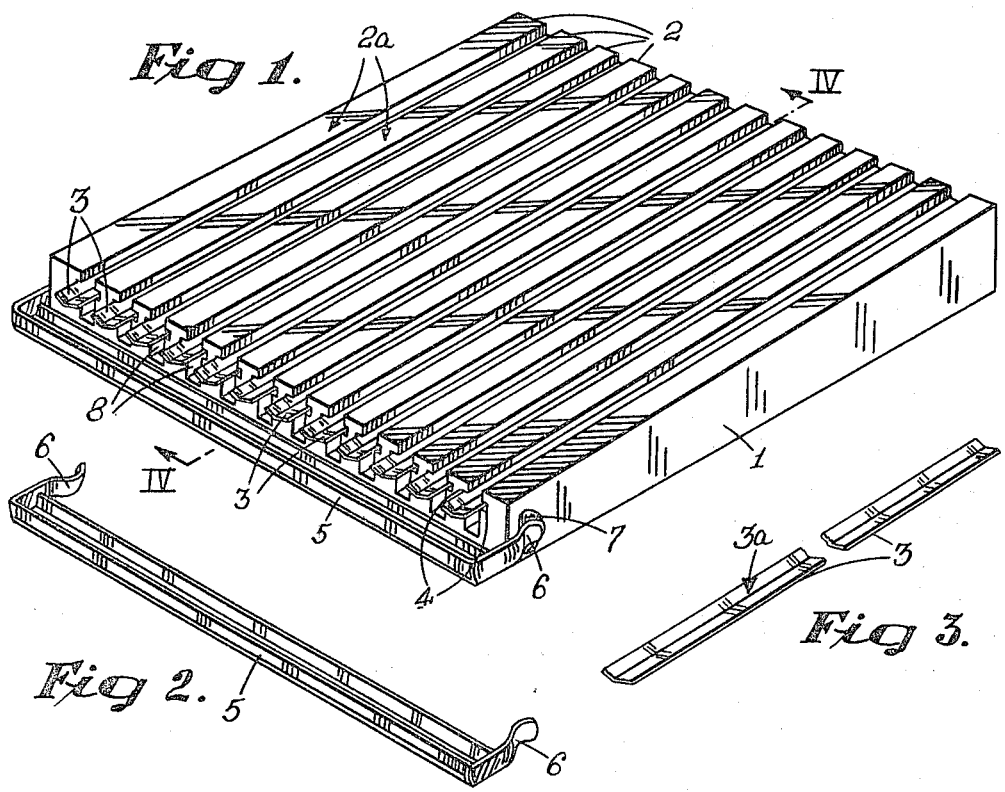
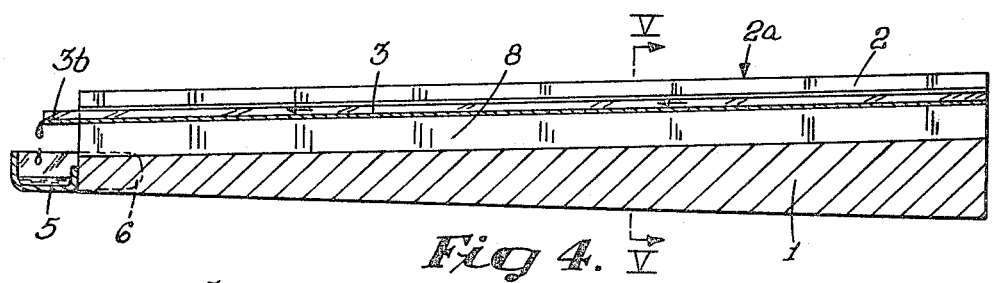
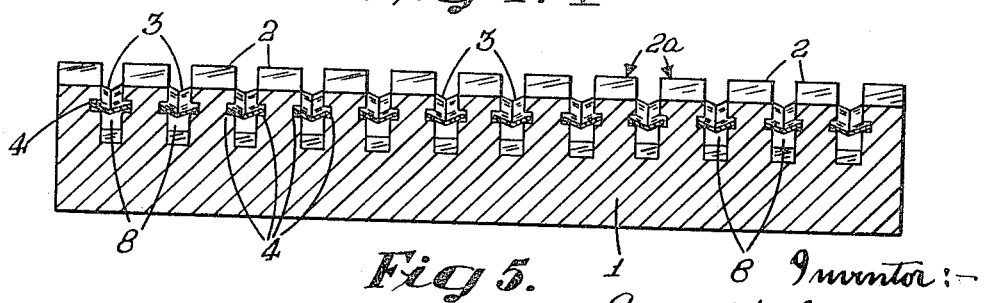
Inventor:—
Armando Spagnolo,
By:— Idowson & Idowson,
His Attorneys.

United States Patent Office

3,308,747
Patented Mar. 14, 1967

3,308,747
GRILLERS AND LIKE APPLIANCES
Armando Spagnolo, 11 Joel Road, Berea, Johannesburg,
Transvaal, Republic of South Africa
Filed July 21, 1964, Ser. No. 384,092
Claims priority, application Republic of South Africa,
Aug. 1, 1963, 63/3,460
1 Claim. (Cl. 99—400)

This invention relates to grillers and like appliances.

According to the invention a griller or like appliance includes a plurality of spaced food grilling formations heatable to food grilling temperature; and grease receiving surfaces between the grilling formations, the grease receiving surfaces being arranged to be at a lower temperature than the grilling formations when the latter are heated.

The term "grease" is intended to include any fat, juice or the like discharged from meat or other food being grilled.

The grilling formations can be heated to any required temperature to grill meat or other food suitable for grilling which is placed on the grilling formations. Fats and juices discharged from grilling food are caught by the grease receiving surfaces. By arranging for the temperature of these surfaces to be sufficiently low, the development of undesirable smoke and odours during grilling can be minimized.

Preferably, the grease receiving surfaces are located at a lower level than the upper surfaces of the grilling formations when the griller is in operative position.

Preferably also, the grease receiving surfaces are arranged to slope downwardly towards a collection zone when the griller is in operative position, to permit any grease in liquid form to gravitate towards the collection zone.

This may be achieved by arranging the grilling formations and the grease receiving surfaces as a whole to be inclined to the horizontal when the griller is in operative position. Alternatively, the grease receiving surfaces only may be inclined to the horizontal when the griller is in operative position.

Any suitable grease receptacle may be provided in the collection zone for collecting liquid grease gravitating down the grease receiving surfaces.

The grilling formations may be made of relatively high heat conductive material; and the grease receiving surfaces may be presented by elements of relatively low heat conductive material located between the grilling formations.

The griller may include a base of relatively high heat conductive material arranged to be heated, the grilling formations being in heat conductive contact with and extending upwardly from the base, and the grease receiving elements being located in spaced relationship above the base.

The grilling formations may be in the nature of elongated grating formations located in spaced and juxtaposed relationship, a grease receiving element being located between each pair of adjacent grilling formations.

The grease receiving elements may slope downwardly towards one end when the griller is in operative position, and project at their lower ends beyond the grilling formations, a grease receptacle being located underneath the lower ends of the grease receiving elements.

Each grease receiving element may be slidably and removably receivable along opposite sides in opposed slots in a pair of adjacent grilling formations.

The slots in the grilling formations may be located at an angle to the lower surface of the base whereby the grease receiving elements slope downwardly towards one end of the grating formations when the griller is in operative position.

A preferred embodiment of the invention will now be described by way of example with reference to the accompanying drawings in which:

FIGURE 1 is a perspective view of a griller according to the invention;

FIGURE 2 is a perspective view of the removable grease receptacle of the griller of FIGURE 1;

FIGURE 3 is a fragmentary perspective view of a removable grease receiving element of the griller of FIGURE 1;

FIGURE 4 is a section to an enlarged scale on the line IV—IV in FIGURE 1; and

FIGURE 5 is a section on the line V—V in FIGURE 4.

The griller comprises base 1 of relatively high heat conductive material, such as aluminum, and a plurality of spaced and juxtaposed, elongated grilling formations 2 integral with and therefore of the same material as base 1. Grilling formations 2 extend upwardly from base 1 and are separated from one another by spaces 8.

A grease receiving element 3 of relatively low heat conductive material, such as iron, is located in each space 8 between each pair of adjacent grilling formations 2 at a lower level than the upper surfaces 2a of grilling formations 2 when the griller is in operative position. Each element 3 is slidably receivable along opposite sides thereof in longitudinally extending opposed slots 4 in a pair of adjacent grilling formations 2 and are longitudinally withdrawable for cleaning purposes. Elements 3 present upwardly facing grease receiving surfaces 3a and are located in spaced relationship above base 1.

Slots 4, elements 3 and the upper surfaces 2a of grilling formations 2 are located at an angle to the lower surface of base 1 whereby elements 3 slope downwardly towards one end 3b when base 1 rests in operative position on a horizontal supporting surface (not shown). This can be seen clearly from FIGURE 4.

Elements 3 project at their lower ends 3b beyond grilling formations 2 and a removable grease receptacle 5 is located underneath the lower ends 3b of elements 3. Receptacle 5 has clips 6 at opposite ends for engaging recesses 7 in the sides of the griller. In use, base 1 is heated in any suitable manner on its lower surface, such as by being placed on a heated stove plate or by being subjected on its lower surface to the action of a gas flame. Since base 1 and integral grilling formations 2 are of relatively high heat conductive material, grilling formations 2 heat up to a suitable temperature for grilling meat or other food suitable suitable for grilling which is placed thereupon. Since grease receiving elements 3 are of relatively low heat conductive material and because of their location relative to base 1 and grilling formations 2 in spaces 8, grease receiving elements 3 are at a lower temperature than grilling formations 2 when the latter are heated.

Fats and juices discharged by food grilling on grilling formations 2 are caught by grease receiving elements 3 and can gravitate down the inclined elements 3 towards grease receptacle 5. Since elements 3 are at a lower temperature than grilling formations 2, the development of undesirable smoke and odours during grilling are avoided, or at least minimized.

Removal of elements 3 and receptacle 5 facilitate cleaning of the griller.

It will be appreciated that the food is not subjected to the direct action of a flame or other heating means employed, but to the action of heat conducted along grilling bars 2 from base 1. Also, since grease and other juices can gravitate towards receptacle 5, the collection of liquid directly underneath grilling food is minimized, thereby to minimize the rising of steam from heated liquid onto the food.

It will be appreciated that many variations in detail are possible without departing from the scope of the appended claim.

A griller according to the invention can be designed to be relatively simple in construction, to be easy to clean and to produce grilled food of superior quality.

I claim:

A griller comprising a base of a one piece construction; a plurality of food grilling formations of one piece with and extending upwardly from the base in spaced and juxtaposed relationship to one another; a pair of longitudinally extending and opposed slots in each pair of adjacent grilling formations in spaced relationship above the base; and a grease receiving element located between each pair of adjacent grilling formations in spaced relationship above the base, opposite longitudinal sides of each grease receiving element being frictionally held in the slots in the relevant pair of adjacent grilling elements, wherein the grease receiving elements have a lower heat conductivity than the base and grilling formations, and slope downwardly towards a collection zone when the griller is in operative position; and a grease receptacle is provided in the collection zone.

References Cited by the Examiner

UNITED STATES PATENTS

| | | | |
|---|---|---|---|
| 2,112,521 | 3/1938 | Cunningham | 99—425 |
| 2,175,333 | 10/1939 | Wilson | 99—425 |
| 2,367,626 | 1/1945 | Shroyer et al. | 99—425 |
| 3,130,662 | 4/1964 | Robinson | 99—446 |

FOREIGN PATENTS

| | | |
|---|---|---|
| 591 | 1852 | Great Britain. |
| 480,008 | 2/1938 | Great Britain. |

BILLY J. WILHITE, *Primary Examiner.*